United States Patent [19]
Smith et al.

[11] Patent Number: 5,809,017
[45] Date of Patent: Sep. 15, 1998

[54] METHOD OF MINIMIZING UNDERSIRABLE RF EMISSIONS WITHIN A TDMA SYSTEM

[75] Inventors: David Anthony Smith, Guildford, Great Britain; Mats Hakan Dahlin, Taby, Sweden; Hans Jonas Peter Rojestal, Spanga, Sweden; Lennart Nils Adolf Lofgren, Vikingstad, Sweden; Erik Mikael Sundberg, Lulea, Sweden; Anders Holmring, Guildford, Great Britain

[73] Assignee: Telefonaktiebolaget LM Ericsson, Stockholm, Sweden

[21] Appl. No.: 575,168

[22] Filed: Dec. 19, 1995

[51] Int. Cl.$^6$ ........................................................ H04J 3/16
[52] U.S. Cl. ............................................ 370/318; 370/321
[58] Field of Search ............................... 370/45.1, 45.2, 370/15, 17, 95.3, 50, 70, 56, 233, 253, 309, 311, 314, 316, 318, 321, 324, 332, 333, 337, 344, 347, 349, 350; 359/180, 137, 186, 187, 135, 136; 379/58–63; 455/67.1, 67.4

[56] References Cited

U.S. PATENT DOCUMENTS

| | | | |
|---|---|---|---|
| 4,955,038 | 9/1990 | Lee et al. | 325/256 |
| 5,485,300 | 1/1996 | Daley | 359/180 |
| 5,519,711 | 5/1996 | Sointula | 455/343 |
| 5,521,904 | 5/1996 | Eriksson et al. | 370/15 |
| 5,521,925 | 5/1996 | Merakos et al. | 370/95.3 |
| 5,606,740 | 2/1997 | Niratsuka et al. | 455/343 |

FOREIGN PATENT DOCUMENTS

| | | |
|---|---|---|
| 0 468 507 | 1/1992 | European Pat. Off. . |
| 0 503 718 | 9/1992 | European Pat. Off. . |
| 2 289 386 | 11/1995 | United Kingdom . |

*Primary Examiner*—Dang Ton
*Attorney, Agent, or Firm*—Burns, Doane, Swecker & Mathis, L.L.P.

[57] ABSTRACT

To minimize the amplitude and spectrum of side bands, beats and harmonics created by changing a transmitter power level between bursts in a GSM TDMA cellular radio communications system, the present invention does not comply with the GSM recommendations by avoiding ramping down to zero power level between time slots. Rather, the transmitter power is ramped between the power value of a previous burst and that of a subsequent burst. In this way, the magnitude or slope of the ramp is minimized and the full time between bursts is available to make power adjustments. A number of embodiments are disclosed.

11 Claims, 2 Drawing Sheets

METHOD OF MINIMIZING UNDERSIRABLE RF EMISSIONS WITHIN A TDMA SYSTEM

BACKGROUND OF THE INVENTION

1) Field of the Invention

The present invention relates to a time domain multiple access (TDMA) transmission power control system for use in cellular radio communication systems and, in particular, to a method of controlling the power levels of transmissions between bursts of information transmitted during the time slots of a GSM TDMA system.

2) Brief Discussion of the Related Art

Many mobile radio systems of various kinds are known and in use. The frequency band available for connections in a mobile radio communication system limits the capacity of the mobile radio systems. Two base or mobile stations transmitting on the same radio channel, i.e., transmitting at the same time on the same frequency, may cause co-channel interference.

In order to be able to simultaneously use the same radio frequency for more than one connection, some mobile radio systems are made into cellular systems. The geographical area to be covered by a system is divided into smaller areas called cells. Mobile stations (e.g., cellular telephones, portable telephones, personal communication devices, etc.) in a cell communicate with a fixed position base station for that cell. Some or all of the available radio channels are distributed among the cells according to a frequency plan. To increase system capacity, in a Time Division Multiple Access (TDMA) system, the frequency is divided into a frame structure of a plurality of time slots. The pan European digital cellular system, abbreviated GSM, is a type of TDMA digital mobile radio communication system currently in use in Europe and elsewhere. This system is specified in the multi-volume document recommendation GSM from ETSI/TC GSM, published by the European Telecommunication Standardization Institute, ETSI 152-F-06561 Valbonne Cedex, France.

The frame structure according to the GSM standard includes eight time slots per frame, as shown in FIG. 1. Each mobile station in communication with the base station uses only one time slot for its voice communication with the base station, allowing up to a total of eight mobile stations to be multiplexed on each frequency used in the cell. The base station typically has a number of transceivers each transmitting on a different frequency or frequencies. Each base station is assigned a minimum of two frequencies in a GSM cellular system.

For purposes of intercell handoff control (where a communication link with a mobile station is handed off to a neighboring cell capable of providing a better communication link) and power control, mobile stations must be located within the cell structure. The locating and call set up functions are based on the measurements of one of the base station's transmitter frequencies, known as carrier 0, which does not change in transmitted power level and does not change frequency. Bursts which are not used for conveying information are filled with an "idle" bursts wherein power is transmitted, but no informational content is conveyed. The carrier 0 transmission is uniformly consistent because mobile stations and other cells periodically measure the signal strength of this frequency and use the measurement to determine RF propagation characteristics with regard to the cell transmitting the carrier 0, and thereby the mobile stations are able to be placed in the best available cell.

To reduce the effects of fast fading, frequency hopping is commonly employed. Frequency hopping means that a mobile station sequentially communicates with a base station on different frequencies, the transmission frequency of both the mobile station and the base station changing between frames of information. A mobile station will generally use the same time slot number, i.e., relative position in a frame, but will tune to a different frequency between each frame under the GSM standard. The base station receivers will also retune to the next frequency to match the frequency hop of the mobile station to maintain the communication link. It is noted that the communications from the base station to the mobile station (the downlink) and communications from the mobile station to the base station (the uplink) are on different frequencies in GSM. Bursts of information on these frequencies may be modulated at different power levels to minimize co-channel interference in neighboring cells. Furthermore, time slots may be empty, i.e., no transmitter transmits information during the particular time slot.

Without frequency hopping, the bursts pertaining to a particular connection are transmitted in the same time slot of the same radio channel, at least until handoff. Thus, in FIG. 1, bursts B1 through B8 would pertain to different connections. Although succeeding bursts in the same time slot of a radio channel may experience somewhat different co-channel interference, i.e., due to the mobile station movements, the changing co-channel interference from one burst to the succeeding bursts pertaining to the same connection, is normally small.

Because of the need to retune the transmitter in frequency hopping systems, the GSM standard defines that the amplitude of the carrier must be ramped down to zero at the end of each burst. Retuning to the next frequency then occurs while transmission power is at zero and power is ramped back up to the power level of the next burst. This is because if retuning occurs while the transmitter is outputting a carrier, the carrier would generate powerful harmonics across and beyond the band which would then cause greater interference. Rapid power ramping also generates significant side bands, but the ramping under the GSM standard is chosen to keep this within acceptable limits, at least as currently defined.

GSM Recommendation 05.05 4.5.1 concerns the situation when two or several consecutive time slots are actually transmitted at the same frequency. No recommendations are specified for power ramping in the guard times between active time slots, but in the normal case, the GSM standard specifies that power is to ramp down to zero (<−70 dB) following each busy burst, and back up at the start of the next busy burst. Specifically, in cases where consecutive busy time slots are not continuous, i.e., where there is one or more idle time slots between busy time slots, the GSM standard directs that power is to ramp to zero (−70 dB).

As shown in FIG. 2, power ramping at the end and the beginning of each burst is shown to take place over a period equivalent to three bits, with a three bit gap between ramps to allow the mobile station to be retuned and a burst length of 147 bits (87 bits in the case of an access burst), under the GSM standard.

A system employing the GSM standard suffers from a number of problems. The inter-burst gap and the ramping down and up of the power levels on either side of a burst will generate strong signals at the time slot frequency, and at the harmonics of that frequency. These signals have been shown to cause unacceptable levels of interference in a wide range of electronic devices under certain conditions, which may conceivably arise in publicly accessible areas. For instance, a loud buzzing in some hearing aid designs might occur. There has also been concern expressed about the possible effects on medical equipment. Further, transmitter power levels generally have become a matter of public concern. The public concern may grow as the number and usage of GSM mobile stations increases and the RF field strength increases to provide greater coverage, for instance, employing 1800/1900 MHz, or capacity increases as extra frequency bands are added to the cells. In the worst case, if not resolved, the problem might result in pressure to restrict the use of GSM drive systems or perhaps reducing the maximum downlink power level.

SUMMARY OF THE INVENTION

The present invention addresses the above concerns and problems of the prior art by employing a deviation from the current GSM recommendations and is thus counter to the conventional teachings in the art. The present invention avoids the generation of significant side bands between bursts caused by the GSM standard's requirement that the power level be ramped down to zero and back to the power level of the next burst. The present invention ramps between the power level of the previous busy burst (a non-idle burst) and that of the next busy burst, or simply the next burst whether an idle burst or a busy burst, in non-hopping or base band hopping systems.

In non-hopping and base band hopping systems, which do not need to retune the transmitter between bursts, a power control method in accordance with the present invention is not ramped down to zero and back to a predetermined power level between time slots. Rather, the present invention ramps between the power level of the previous burst and the burst that immediately follows. In this way, the magnitude or slope of the transmitter power ramp is minimized and the full time between bursts is available to make the power level adjustment. Thus, the rate of change in power level is minimized which results in the corresponding minimization of the spectrum and amplitude of the side bands, the beats and the harmonics created by the changing transmitter power levels. Where two adjoining bursts are at the same power level, no adjustment occurs at all and therefore no undesirable effects are produced whatsoever unlike a conventional GSM transmitter a power control.

In accordance with the principles of the present invention, an embodiment thereof can be employed in a time division multiple access radio communication system (wherein at least one frequency is divided into a plurality of time slots, a burst of information occupying at least one of said time slots) as a method of controlling power ramping between time slots comprising the steps of (1) controlling a output power level of a transmitter to a determined level during a busy time slot (wherein a burst of information is transmitted) and (2) ramping the output power of the transmitter between the power value of a previous busy burst and the power level of a next burst without ramping power down to a zero power level between time slots.

According to a second aspect of the present invention, in this method, the ramping step is carried out only in transmitters which do not require retuning between bursts.

According to a third aspect of the present invention, the method includes the further steps of filling idle time slots with idle bursts, wherein said transmitter outputs power but no information, and transmitting the idle bursts at a power level equal to that of a preceding busy burst.

According to a fourth aspect of the present invention, the method includes the further steps of filling idle time slots with idle bursts, wherein said transmitter outputs power but no information, and transmitting the idle bursts at a power level equal to that of a subsequent busy burst.

According to a fifth aspect of the present invention, the method includes the further steps of filling idle time slots with idle bursts, wherein said transmitter outputs power but no information, and arbitrarily setting the power level of one or more idle filling bursts to a value between a maximum power level and zero power level.

According to a sixth aspect of the present invention, the method includes the further steps of filling idle time slots with idle bursts, wherein said transmitter outputs power but no information, and adaptively setting the power level of one or more idle filling bursts to a value interpolated between a preceding and a subsequent busy burst.

According to a seventh aspect of the present invention, in this method, the output power of the transmitter is ramped across a period between the end of one busy burst and the beginning of a subsequent busy burst, the power level of any intervening idle bursts being maintained at a constant level during the intervening idle burst.

According to an eighth aspect of the present invention, in this method, the output power of the transmitter is ramped across an entire period between the end of one busy burst and the beginning of a subsequent busy burst.

BRIEF DESCRIPTION OF THE DRAWINGS

These and other aspects of the invention will now be described by way of exemplary embodiments with reference to the accompanying drawings, in which.

DETAILED DESCRIPTION OF THE PREFERRED EMBODIMENTS

In systems under the GSM standard, regardless of whether the communication link hops or does not hop, the transmitter power level must be brought to zero between bursts. In Europe, because of the limited frequency spectrum assigned to mobile communications, the majority of the time slots on each frequency will be utilized during peak periods. This is because each cell is typically assigned only a few frequencies, one of which is assigned as carrier 0. Whether the system hops or does not hop between frequencies, the transmitter power between bursts ramps all the way down to zero and back up to an appropriate level between bursts. The present invention is based in part on the recognition that the transmitter in the base station does not need to be retuned between bursts in a non-hopping employment of the GSM standard.

Additionally, GSM systems may employ base band hopping wherein the radio channel hops between a plurality of transmitters in a base station, each transmitter being dedicated to one frequency so that the individual transmitters do not need to be retuned. This is opposed to the synthesizer hopping schemes mentioned above where the oscillator frequency of a transmitter in a base station or a mobile station is varied so that the transmitter frequency hops between frames.

In non-hopping and base band hopping systems, or in any communication method which does not need to retune the transmitter between bursts transmitted in discrete time slots, the present invention involves not ramping transmitter output power down to zero and back between times lots. Rather, the power is ramped between the power level of a previous burst and the power level of a subsequent burst without dropping to a zero power level. In this way, the magnitude of the ramp is minimized and the full time between bursts is available to make the adjustment. Because the rate of change in power level is minimized, a corresponding minimization in the spectrum and amplitude of the side bands, the beats and the harmonics are achieved. Where two adjoining bursts are at the same level, no adjustment need occur at all and therefore no undesirable effects are produced.

Figure 1:
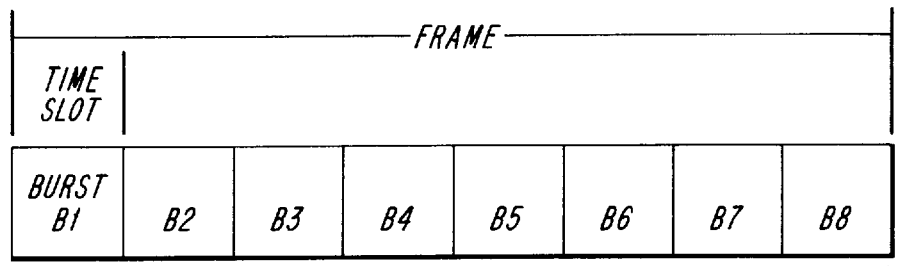
FIG. 1 illustrates the burst format of a conventional GSM TDMA cellular telephone system.
Figure 2:
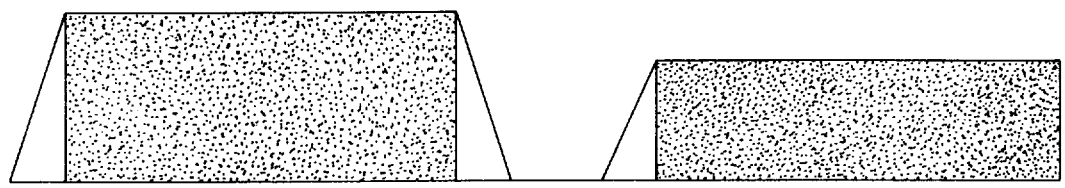
FIG. 2 illustrates the power ramping at the beginning and ending of each burst within the conventional GSM TDMA system.
Figure 3:
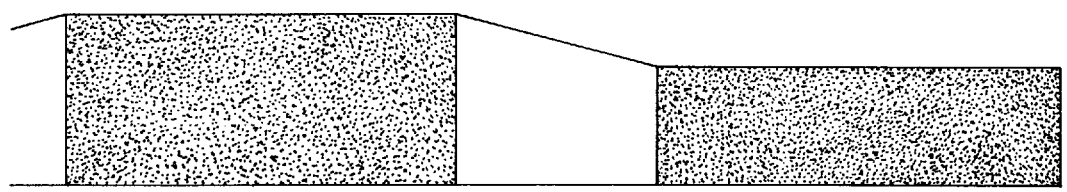
FIG. 3 illustrates the power ramping over the entire period between bursts on carriers from a transmitter that do not have to be retuned, in accordance with a first embodiment of the present invention.

As shown in FIG. 3, a first embodiment of the present invention involves ramping over the entire period between bursts when the carrier from a transmitter does not have to be retuned between bursts. If all the bursts are at the same power level, no ramping is required. The slope of the ramp is reduced or eliminated and which minimizes the rate of change in the power level and thereby minimizes the side bands, beats and harmonics which such changes in output power creates.

Figure 4:
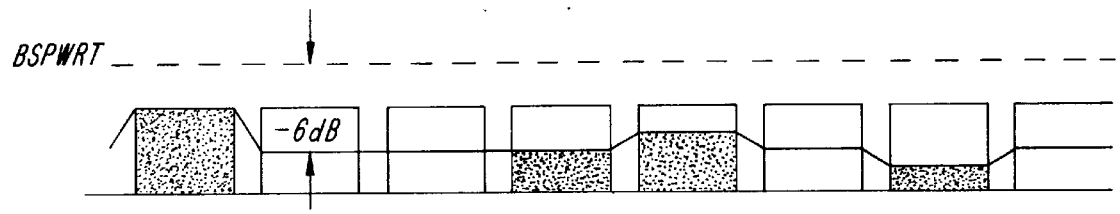
FIG. 4 illustrates a modification of the embodiment shown in FIG. 3 wherein filling bursts occupy otherwise idle time slots to minimize undesirable emissions, in accordance with a second embodiment of the present invention.

The second embodiment illustrated in FIG. 4 includes that all such non-hopping transmitters including the base band hopping systems, use an idle burst to fill in time slots which are not used for information transmission. This results in a reduced slope in the rate of change in transmitter power level. The extended ramping minimizes undesirable emissions as described above. In the embodiment shown in FIG. 4, the idle bursts are introduced at an arbitrary power level between zero and a maximum level. For example, the arbitrary power level can be –6 dBs relative to BSPWRT, the base station maximum power level for transmission channels in a dynamical power control system, other than the carrier 0, the base station control channel. As shown in FIGS. 4–8, busy bursts are indicated by dark gray squares whereas the empty or idle bursts are indicated by the non-shaded squares. The solid line of FIGS. 4–8 shows the relative ramping level between the bursts.

Figure 5:
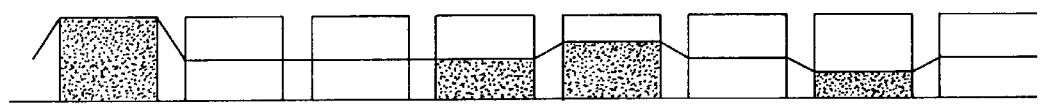
FIG. 5 illustrates power ramping over an entire period between bursts that are occupied by communications wherein intervening idle time slots are filled with bursts at an arbitrary level, in accordance with a third embodiment of the present invention.

In the third embodiment shown in FIG. 5, the power level of the filling burst is set in some special way. The possibilities include a fixed or operator defined level, perhaps 3 or 6 dBs below BSPWRT, as some form of compromise between the maximum power level and zero power level. The compromise level can be determined to minimize the average slope of any ramping which will likely occur in a specific situation, this average slope may be determined in a number of ways, perhaps through statistical analysis, extrapolation or experimental observation.

Figure 6:
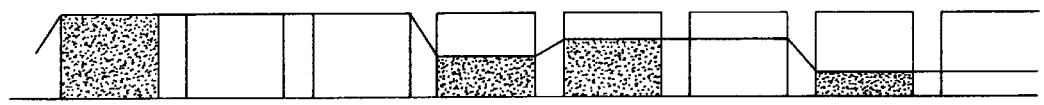
FIG. 6 illustrates a fourth embodiment of the present invention wherein the power level of idle bursts is set to that of the power level preceding busy bursts.

In accordance with the fourth embodiment of the present invention shown in FIG. 6, the present invention may be embodied by automatically filling idle time slots with idle bursts transmitted at the same power level as the preceding burst. In such an embodiment, no undesirable emissions arise in the inter-burst gap, at least until the power level is adjusted to accommodate the next non-idle or busy burst. The same power level is repeated indefinitely until the next non-idle burst, at which time power is ramped directly to the new value without going through a zero power level. As shown in FIG. 6, the power level of the idle burst(s) is set to that of the preceding busy burst and ramping between the busy burst and a following busy burst is as though the idle bursts were real bursts.

Figure 7:
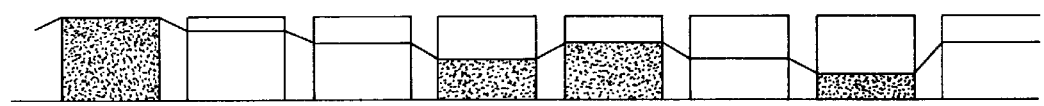
FIG. 7 illustrates a fifth embodiment of the invention wherein the power level of idle burst are interpolated between the levels of the adjacent busy bursts, the power level in each individual burst being held constant.

FIG. 7 shows an enhanced form of the above fourth embodiment which uses either multiple inter bursts gaps between the two busy bursts (i.e., separated by one or more idle burst), or the inner bursts gaps and the idle bursts themselves to do the power ramping by interpolating the value between the busy bursts. As shown in FIG. 7, in this fifth embodiment, the idle burst power levels are interpolated between the levels of the busy bursts with the power level within each burst being held constant.

Figure 8:
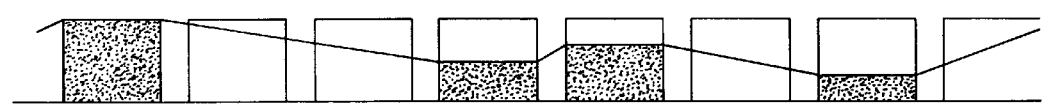
FIG. 8 illustrates a sixth embodiment of the invention illustrating smooth power ramping across an entire period between busy bursts.

The sixth embodiment, shown in FIG. 8, is a variation of the fifth embodiment wherein a smooth power ramping across the entire period between busy bursts is employed, the power ramping also occurring within the time slots of idle bursts.

If all of the bursts on a frequency are idle, power can be ramped down to zero over an extended period to minimize the undesirable intermodulation transmission products.

The present invention achieves the objects of avoiding or minimizing the generation of intermodulation products due to rapid power ramping at the start and at the end of each burst. This will minimize the unwanted side effects such RF emissions have on electronic and other devices in proximity to the transmitter.

It will be appreciated by those of ordinary skill in the art that the present invention can be embodied in other specific forms without departing from the scope thereof. For instance, the present invention will typically be embodied in base stations, particularly base stations employing base band hopping. However, mobile stations can employ the invention. The presently disclosed embodiments are therefore considered in all respects to be illustrative and not restrictive. The scope of the invention is indicated by the appended claims rather than the foregoing description and all changes which come within the meaning and range of equivalence thereof are intended to be embraced therein.

We claim:

1. In a time division multiple access radio communication system wherein at least one frequency is divided into a plurality of time slots, a method of controlling power ramping between time slots comprising the steps of:

controlling an output power level of a transmitter to a determined level during a busy time slot wherein a burst of information is transmitted; and ramping the output power of the transmitter between said output power level of said busy time slot and an output power level of a subsequent busy time slot over the entire period between said busy time slot and said subsequent busy time slot without ramping power down to a zero power level between these busy time slots, wherein a rate of said ramping is determined by the output power of said busy time slot and the output power of said subsequent busy time slot.

2. In a time division multiple access radio communication system wherein at least one frequency is divided into a plurality of time slots, a method of controlling power ramping between time slots comprising the steps of:

controlling an output power level of a transmitter to a determined level during a busy time slot wherein a burst of information is transmitted;

filling idle time slots with idle bursts, wherein said transmitter outputs power but no information;

transmitting said idle bursts at a power level equal to that of a preceding busy time slot; and ramping the output power of the transmitter between said output power level of said busy time slot and an output power level of a subsequent busy time slot without ramping power down to a zero power level between these busy time slots.

3. In a time division multiple access radio communication system wherein at least one frequency is divided into a plurality of time slots, a method of controlling power ramping between time slots comprising the steps of:

controlling an output power level of a transmitter to a determined level during a busy time slot wherein a burst of information is transmitted;

filling idle time slots with idle bursts, wherein said transmitter outputs power but no information;

transmitting said idle bursts at a power level equal to that of a subsequent busy time slot; and ramping the output power of the transmitter between said output power level of said busy time slot and an output power level of a subsequent busy time slot without ramping power down to a zero power level between these busy time slots.

4. In a time division multiple access radio communication system wherein at least one frequency is divided into a plurality of time slots, a method of controlling power ramping between time slots comprising the steps of:

controlling an output power level of a transmitter to a determined level during a busy time slot wherein a burst of information is transmitted; filling idle time slots with idle bursts, wherein said transmitter outputs power but no information;

arbitrarily setting a power level of one or more of said idle bursts to a value between a maximum power level and zero power level; and ramping the output power of the transmitter between said output power level of said busy time slot and an output power level of a subsequent busy time slot without ramping power down to a zero power level between these busy time slots.

5. In a time division multiple access radio communication system wherein at least one frequency is divided into a plurality of time slots, a method of controlling power ramping between time slots comprising the steps of:

controlling an output power level of a transmitter to a determined level during a busy time slot wherein a burst of information is transmitted;

filling idle time slots with idle bursts, wherein said transmitter outputs power but no information;

adaptively setting a power level of one or more idle bursts to a value interpolated between a preceding and a subsequent busy time slot; and ramping the output power of the transmitter between said output power level of said busy time slot and an output power level of a subsequent busy time slot without ramping power down to a zero power level between these busy time slots.

6. The method according to claim 5 wherein an output power of the transmitter is ramped across a period between the end of the preceding busy time slot and the beginning of the subsequent busy time slot, the output power level of any intervening idle burst being maintained at a constant level during said intervening idle burst.

7. The method according to claim 5 wherein an output power of the transmitter is smoothly ramped across an entire period between the end of the preceding busy time slot and the beginning of the subsequent busy time slot.

8. The method according to claim 1, wherein said ramping is progressive between said busy time slot and said subsequent busy time slot.

9. The method according to claim 1, wherein said output power of said busy time slot may be different from said subsequent busy time slot.

10. The method according to claim 1, wherein a sign of a rate of change during said ramping between said busy time slot and said subsequent busy time slot is constant.

11. The method according to claim 1, wherein there is an arbitrary number of idle time slots between said busy time slot and said subsequent busy time slot.

* * * * *